Nov. 23, 1926.

R. F. THOMAS 1,608,444

STEERING GEAR OF TRACTORS OF THE TANK TYPE

Filed Dec. 20, 1924

WITNESSES

INVENTOR
Raymond Fredrick Thomas.
BY
ATTORNEYS

Patented Nov. 23, 1926.

1,608,444

UNITED STATES PATENT OFFICE.

RAYMOND FREDRICK THOMAS, OF MANOORA, SOUTH AUSTRALIA, AUSTRALIA.

STEERING GEAR OF TRACTORS OF THE TANK TYPE.

Application filed December 20, 1924, Serial No. 757,239, and in Australia July 3, 1924.

This invention relates to certain improvements in and relating to the steering gear of a tractor of the tank type whereby, when the tractor is drawing an implement or vehicle, the tractor is steered from the implement or vehicle and use is made of the movement of the tractor when it deviates from its course (as when it strikes an obstruction) to act upon the steering gear to cause the tractor to automatically return to and maintain its correct course.

I am aware that extension steering shafts have been fitted to tractors to enable them to be steered from a trailing implement or vehicle but so far as I am aware none of these cause the tractor to automatically return to its course after accidental deviation therefrom.

In order that my invention may be clearly understood I will describe the same with reference to the accompanying drawings in which—

Figure 1:
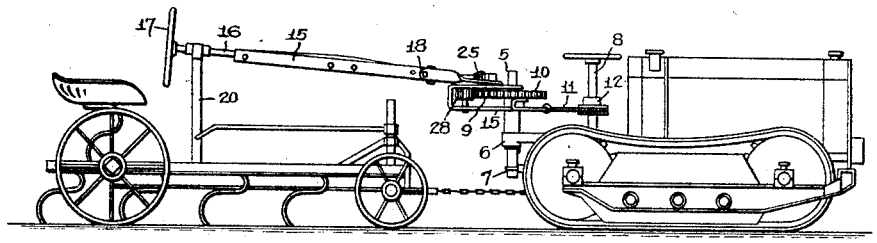

Fig. 1 is a side view representing somewhat diagrammatically a tractor drawing a cultivating implement.

Figure 2:
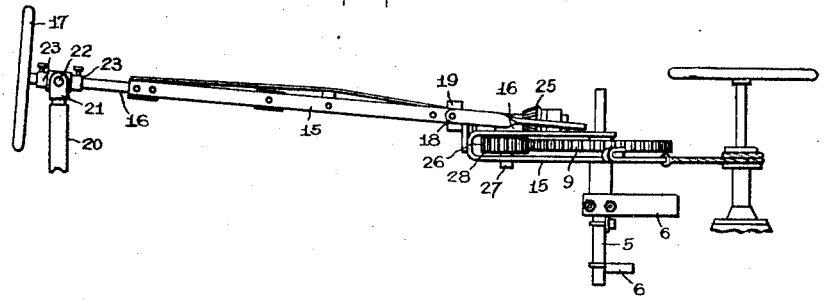
Figure 3:
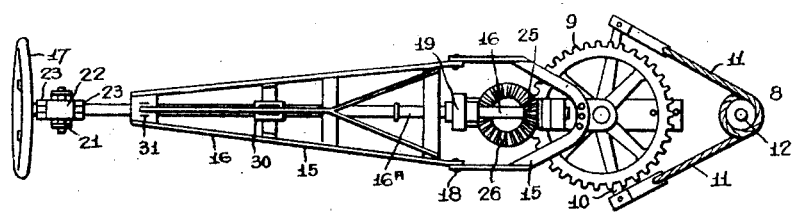

And Figs. 2 and 3 are side and plan views respectively showing to a larger scale the essential features of my invention.

According to my invention a short vertical post 5 is securely fastened by a bracket or other device to some convenient part of the tractor frame behind the usual steering column 8. In the drawing I have shown an angle iron bracket 6 and a lower stay 7 for this purpose. The usual seat is removed from the tractor and the angle iron bracket bolted to the tractor in place thereof. The stay 7 is bolted to the draw bar.

Mounted upon this post 5 and near its upper end so as to be rotatable thereon is a large spur wheel 9 which carries a transverse bar 10 to which are fastened the two ends of a length of wire rope or chain 11 which is positioned in front of the spur wheel 9 and is passed around a pulley wheel 12 (as around a capstan) that is securely fastened upon the steering column 8, the rope 11 being fastened to the pulley wheel 12 so that no slip can occur. Since the spur wheel 9 makes only a partial rotation about the post 5 and relatively to the frame 15 the teeth upon its front part may be omitted. The transverse bar is employed in order to spread apart the ends of the wire rope and thereby give a much greater turning movement to the steering column. The usual steering wheel upon the top of the steering column need not be interfered with. It is shown in position in Figs. 1 and 2 but omitted from Fig. 3. In place of the transverse bar 10, rope 11 and pulley wheel 12, a spur wheel may be secured upon the column 8 and connected to the spur wheel 9 by an intermediate spur wheel mounted upon a post rising from the bracket 6.

Also mounted upon the upper end of the beforementioned post 5 and so as to be able to oscillate thereon is the forward end of a light frame 15 which carries a rearwardly extending approximately horizontal telescopic extension steering shaft 16 together with gear devices whereby motion is transmitted from such shaft 16 to the spur wheel 9.

The rear end of this frame 15 extends rearwardly over the implement or vehicle that is attached to the tractor so that the hand wheel 17 upon its rear end is in a convenient position for operation by the driver upon the seat of such implement or vehicle.

In order to permit of vertical movement of the rear of the tractor and the front of the implement relatively one to the other the frame 15 is formed with a horizontal hinge 18 and the extension shaft 16 is formed with a universal joint 19 in line with the hinge 18. The rear end of the shaft 16 is supported by means of a post 20 rising from the frame of the implement. In the top of this post is a forked bracket 21 free to oscillate in a socket in the top of the post and carrying a gimbal mounted bearing block 22 through the centre of which the shaft 16 passes. Collars 23 secured upon the shaft before and behind the block 22 prevent endwise movement of the shaft in the block but otherwise the shaft is free to move in any direction required.

Upon that portion of the frame forward of the hinge 18 is carried a gear device which transmits motion from the extension steering shaft 16 to the spur wheel 9. A suitable gear device comprises a bevel pinion 25 secured upon the forward end of the shaft 16 which in turn engages a bevel pinion 26 secured upon the upper end of a short vertical shaft 27 upon the lower end of which is a small spur wheel 28 which meshes with the large spur wheel 9. The front end of the horizontal shaft 16 and the vertical shaft 27 are carried in bearings in the frame 15.

The extension steering shaft 16 is made telescopic to allow for the distance between tractor and implement not being constant, as on short turns. This is accomplished by making the main portion of the shaft of a length of tube with its forward end worked to a rectangular cross section and fitting therein a square bar 16A, the front end of the bar 16A, being attached to the universal joint 19, and the circular tubular main portion of the shaft being slidable endwise in the bearings 30 and 31 on the frame 15. The length of the shaft will depend upon the distance the hand wheel 17 requires to be from the tractor.

Instead of the foregoing I may connect the end of the extension steering shaft 16 with the spur wheel 9 by means of a worm and a wheel connection, a worm wheel secured upon the end of the steering shaft gearing into the teeth of the spur wheel.

The throttle control and the clutch lever are operated by cords the ends of which are attached to some part of the implement within reach of the driver.

The operation of this device is as follows—

When it is desired to steer or turn the tractor from the trailing implement or vehicle, as at the end of a furrow or elsewhere, the extension steering shaft 16 is rotated by means of the hand wheel 17 upon the end of same and this operates through the gear device at the head of the vertical post 5 and causes the spur wheel 9 to make a partial rotation about same. This spur wheel in turn through the transverse bar 10 and rope connection 11 to the pulley 12 upon the steering column 8 causes the steering column to make a partial rotation and so work the steering mechanism to govern in the usual way the endless tracks of the tractor.

When the tractor is thrown out of its course by a stump or other obstruction or from other cause, the deviation of the tractor alters the position of the steering column 8 relatively to that of the vertical post 5 and of the spur wheel 9 and transverse bar 10 carried by same. The post 5 makes a partial rotation within the spur wheel 9. As, owing to their connection to the extension steering shaft 16 and frame 15 the wheel 9 and bar 10 and consequently the rope 11 cannot move, and as the rope 11 is fastened to the pulley 12 upon the steering column 8 the result is that the steering column 8 is caused to make a partial rotation thereby automatically working the steering mechanism to correct the direction of the tractor causing it to come back to the normal direction, whereupon it tends to straighten up again and, as the tractor swings back to its normal position in relation to the transverse bar, the rope 11 operates the pulley in the opposite direction until the tractor resumes its correct course.

The connection between the steering column of the tractor and the steering mechanism differs with different makes of tractors but such differences do not affect the application of my invention.

What I claim as my invention is—

1. Means for causing a tractor of the tank type when drawing an implement or vehicle to automatically return to its course after accidental deviation therefrom and to enable the tractor to be steered from the implement or vehicle comprising the combination with the usual steering column of the tractor of:—a vertical post rigidly fastened to the rear portion of the tractor frame; a spur wheel rotatably mounted upon the upper part of said post; operative connection between said spur wheel and the steering column; an extension steering shaft supported at its front end by a frame oscillatable upon said post and at its rear end by a post rising from the trailing implement or vehicle; and operative connections between the end of said extension steering shaft and said spur wheel.

2. Means for causing a tractor of the tank type when drawing an implement or vehicle to automatically return to its course after accidental deviation therefrom and to enable the tractor to be steered from the implement or vehicle comprising a pulley wheel fastened upon the steering column of the tractor; a vertical post fastened to the rear portion of the tractor frame; a spur wheel rotatably mounted upon said post and carrying a transverse bar; a length of wire rope passing around and secured to the said pulley wheel and having its two ends secured to the two ends of said transverse bar; and an extension steering shaft supported at its rear end by the implement or vehicle and at its front end by a frame mounted to oscillate upon the said post, and having a hand wheel upon its rear end and having its front end connected by operative gearing with said spur wheel.

3. In means for steering tractors the combination with a vertical post rigidly fastened to the rear portion of the tractor frame; of a spur wheel rotatably mounted upon said post; a steering column, operative connection between the spur wheel and steering column; a hinged frame mounted at its front end to oscillate upon said post; a telescopic extension steering shaft rotatable in bearings in said frame and supported at its front end by said frame and at its rear end by universal joint on a post rising from the implement, and having on its rear end a hand wheel, and having its front end connected by operative gearing with said spur wheel.

4. In means for steering tractors:—a vertical post rigidly fastened to the rear portion of the tractor frame; a post rising from the frame of the trailing implement or vehicle; a spur wheel rotatably mounted upon the post rising from the tractor frame; a rotatable telescopic extension steering shaft made up of rear, middle and front portions, the rear portion comprising a length of tube the rear end of which carries the steering wheel and is supported by the post rising from the implement frame and the front end of which is worked to a rectangular cross section, the middle portion comprising a square bar the rear end of which fits slidably in the front end of the tubular rear portion, and the front portion comprising a length of rod the rear end of which is connected by a universal joint to the front end of the middle portion and the front end of which carries a bevel pinion; a frame made in two parts joined together by a horizontal hinge adjacent to the universal joint of the extension steering shaft, the forward part being mounted to oscillate upon the vertical post rising from the tractor frame and carrying the forward portion of the extension steering shaft, and the rear part having two bearings in which the rear part of the extension steering shaft rotates; and a vertical shaft carried by the forward part of said frame and having upon its upper end a bevel pinion gearing with the bevel pinion upon the extension steering shaft and upon its lower end a small spur wheel gearing with the spur wheel upon the vertical post rising from the tractor frame.

In testimony that I claim the foregoing as my invention I have signed my name this 27th day of June, 1924.

RAYMOND FREDRICK THOMAS.